United States Patent [19]

Eiting

[11] Patent Number: 4,508,282

[45] Date of Patent: Apr. 2, 1985

[54] SCROLL SLITTING AND REWIND APPARATUS

[75] Inventor: John R. Eiting, Minster, Ohio

[73] Assignee: Precision Strip, Inc., Minster, Ohio

[21] Appl. No.: 478,984

[22] Filed: Mar. 25, 1983

[51] Int. Cl.³ .................... B65H 23/10; B65H 35/02
[52] U.S. Cl. ................................. 242/56.2; 242/56.4; 242/56.5
[58] Field of Search ............... 242/182, 56.5, 76; 226/119, 196; 83/336, 102, 162, 165, 332; 271/4, 5, 6

[56] References Cited

U.S. PATENT DOCUMENTS

| | | | |
|---|---|---|---|
| 2,392,268 | 1/1946 | Schmidt | 226/196 X |
| 3,388,582 | 6/1968 | Wesstrom et al. | 72/335 |
| 3,406,924 | 10/1968 | Bruns et al. | 242/56.4 |
| 3,517,532 | 6/1970 | Zilkowsky et al. | 72/31 |
| 3,672,595 | 6/1972 | Jablin et al. | 242/56.2 X |
| 3,835,681 | 9/1974 | Shumaker | 72/234 |
| 3,863,858 | 2/1975 | Cauffiel et al. | 242/75.2 |
| 4,093,140 | 6/1978 | Matsunaga | 242/56.2 |
| 4,170,691 | 10/1979 | Rogers | 242/56.2 X |
| 4,201,352 | 5/1980 | Madachy | 242/75 |
| 4,219,168 | 8/1980 | Lofstrom | 242/56.2 |

OTHER PUBLICATIONS

"Scanning the Field for Ideas", Machine Design, May 22, 1980, vol. 52, No. 12, p. 42.

Primary Examiner—Stuart S. Levy
Assistant Examiner—Leo J. Peters
Attorney, Agent, or Firm—Wood, Herron & Evans

[57] ABSTRACT

Apparatus is disclosed for scroll slitting metal webs into a serpentine wave shaped form having identically shaped sections spaced apart by a common center-to-center distance. The scroll slitting apparatus includes multiple sets of mating scroll slitting knives mounted upon rotatable arbors for slitting the metal webs into multiple strips having serpentine wave-shaped edge sections. The apparatus also includes a recoiler and a looping pit positioned between the scroll slitting knives and the recoiler. The looping pit permits slack to be placed in the strips between the stripping station and the rewind station such that the strips may all be spaced apart a distance slightly greater than the amplitude of the serpentine wave shaped edge placed on the strips, thereby enabling all the strips to be rewound onto a common arbor or shaft.

2 Claims, 4 Drawing Figures

SCROLL SLITTING AND REWIND APPARATUS

This invention relates to a slitting machine and particularly to a slitting machine or apparatus for scroll slitting a web of sheet metal or similar material into multiple scrolls or strips having scroll shaped edges.

In order to form a plurality of relatively narrow strips from a single relatively wide web or strip of sheet metal, it is well-known to use a slitting line. Slitting lines basically consist of an uncoiler from which a wide web of sheet metal is unwound from a coil, a slitter which slits the webs into a plurality of strips, and a recoiling mechanism which recoils or winds the plurality of strips onto one or more arbors.

The slitting mechanism typically includes upper and lower arbors which are rotatably mounted in housings. Each arbor includes a plurality of rotary cutting members positioned so that the cutting members on the upper arbor intermesh or mate with the cutting members on the lower arbor to provide a scissors-like cutting or slitting operation upon a web of metallic material.

If strips are to be formed having rectilinear longitudinal edges, the rotary cutting members mounted on the arbors are all essentially disc shaped, having circular cutting edges. However, if the slitter is adapted to form strips having curvilinear longitudinal edges, the cutting members or knives are provided with serpentine or sinuous cutting edges. Slitters of this latter type are known as scroll slitters.

It is often desirable to slit a metallic web into strips having serpentine or curvilinear longitudinal edges if circular or disc shaped pieces are to be formed from the slit strips. Examples of products formed from such serpentine or curvilinear longitudinal edge shaped pieces are can ends, motor armatures, and stators and backing plates. The serpentine edges reduce the amount of scrap material wasted in the forming of the disc shaped pieces from the strip. An example of this type of slitting process is disclosed in U.S. Pat. No. 3,517,532 and in U.S. Pat. No. 3,388,582.

One problem which has been common to all prior art scroll slitting lines has been that of rewinding or recoiling the scroll slit strips. This problem is attributable to the fact that to some degree there is "crown" in every wide web of sheet metal rolled stock. The strip is thicker in the center than at either edge and one edge is generally thicker than the other, so a cross section through a strip is generally shaped like a convex lens instead of having parallel flat top and bottom surfaces. The crown creates handling problems when the web or strip is subsequently slit. Because of the crown, the center strips of each web are thicker than the outer edge or side strips so after being slit, the side strips wrap more loosely than the thicker center strips. Consequently, the loose side strips when rewound or recoiled upon a recoiling mandrel present a handling problem because the loosely wound side strips tend to slide around and abrade each other.

This "crown" or varying cross sectional thickness through a web presents a particularly acute problem in the case of scroll slitting. Heretofore, it has never been possible to rewind scroll slit strips onto a common recoil or rewinding mandrel because the differing cross sectional thickness of the webs resulted in the sinuous shaped edges of the scroll slit strips overlapping each other. This overlap is absolutely unacceptable because it precludes one strip from being unwound from the coil if it is interleaved with other strips, etc. Consequently, in the past it has been the practice to rewind or recoil the scroll slit strips on multiple arbors so that the adjacent scroll slit strips end up being wound upon different arbors. In other words, if there were three scroll slit strips cut from a common web, the centermost scroll slit strip would be wound on one arbor and the two outer or spaced strips would be wound upon a second arbor. This practice though is undesirable because it requires two rewinding stations or recoilers, thus increasing capital equipment costs, and additionally requires the handling of at least two recoiling mandrels with consequent increased handling and processing costs. It would be preferable to have all the strips wound upon a single mandrel.

It has therefore been one objective of this invention to provide a scroll slitting apparatus wherein all of the scroll slit strips are rewound upon a common mandrel without any overlap of the scroll shaped edges of the multiple strips.

Another objective of this invention has been to provide a scroll slitting line having only a single rewind recoiler and operable to rewind all of the scroll slit strips of a common web upon a single common mandrel.

These objectives are achieved and this invention is predicated upon the concept of providing a looping pit between the slitting station and the recoiler or rewind station of a scroll slitting line and in providing guide spacers between the strips in the slack strips as those strips emerge from the looping pit and before tension is placed upon the strips for feed onto the rewind or recoiler mandrel. By providing this slack in the strips, or at the very minimum in the edgemost strips, those strips may be moved laterally relative to the center strips so as to provide spacing between the strips at least equal to the amplitude of the sinuous scroll on the edge of the strips. Rewinding tension is only placed on the strips after this spacing is achieved in the slack strips. As so spaced then, the strips may all be wound upon a common recoiler mandrel.

The advantage of this invention is that it eliminates the need for multiple recoiling mandrels on a single scroll slitting line, thereby substantially reducing the capital equipment cost of a scroll slitting line.

Another advantage of this invention is that it enables all of the strips cut from a common web of sheet metal material to be rewound onto a common mandrel. Thereby subsequent handling, processing, and transportation charges are substantially reduced relative to a scroll slitting line wherein the strips are placed upon multiple mandrels.

These and other objects and advantages of this invention will become more readily apparent from the following description of the drawings in which.

Figure 1:
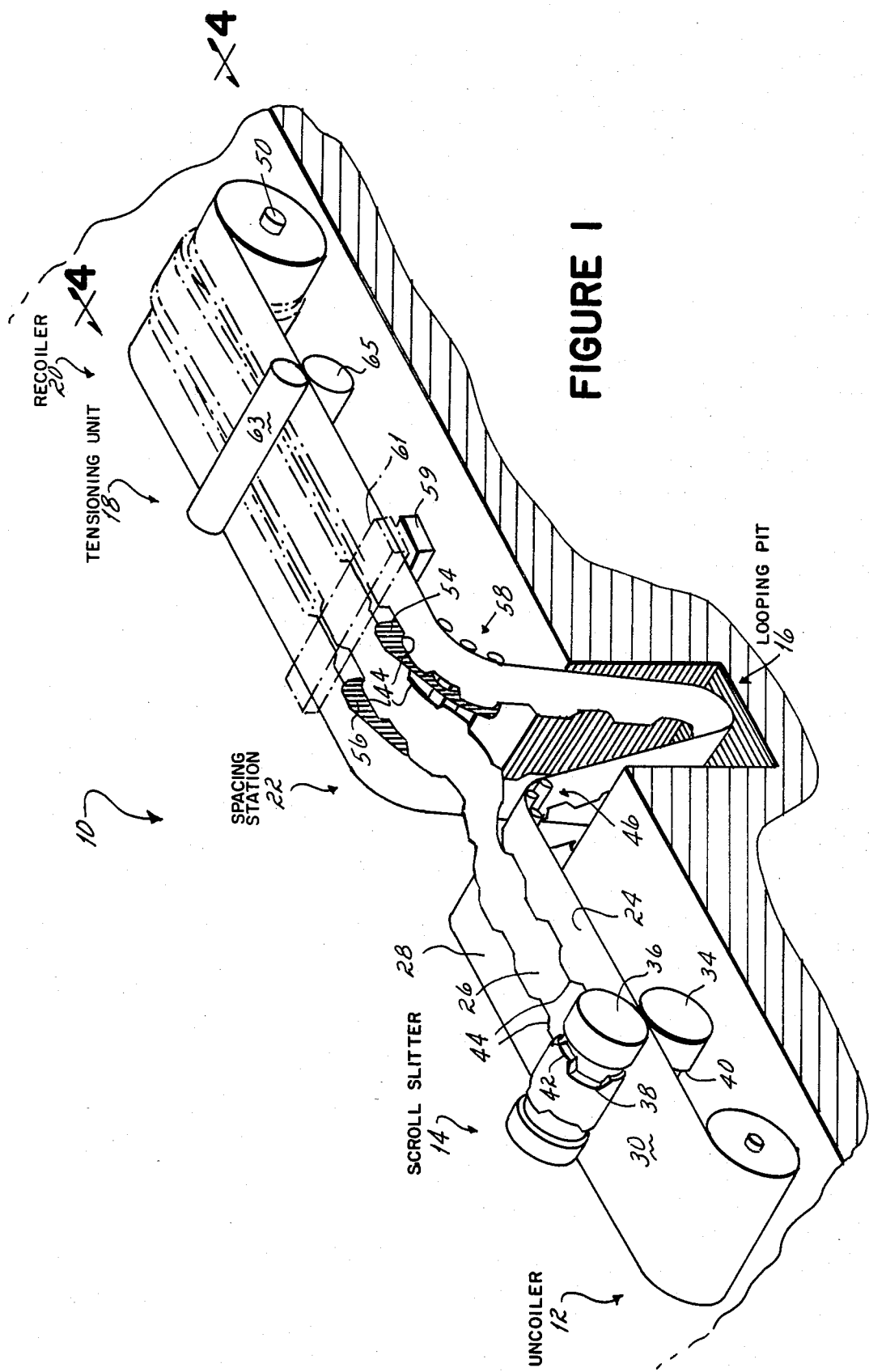
FIG. 1 is a perspective partially diagrammatic view of a scroll slitting line incorporating the invention of this application.

Referring to FIG. 1, there is illustrated a scroll slitting line 10 incorporating the invention of this application. This line 10 comprises an uncoiler station 12, a scroll slitting station 14, a looping pit 16, a tensioning station 18, and a recoiling station 20. Immediately upstream of the tensioning station 18, and as explained more fully hereinafter, there are stationary spacers located at a spacing station 22 for establishing a gap between the scroll slit strips 24, 26, and 28 cut from the web 30 of rolled sheet metal stock metal.

The uncoiler 12 is conventional and forms no part of the invention of this application. Basically, it comprises a motor driven mandrel upon which a coil of web stock 10 is mounted for feed into the scroll slitter.

The scroll slitter 14 is also, for purposes of this application, conventional and per se forms no part of the invention of this application. One scroll slitter suitable for use in this application is fully disclosed in U.S. patent application Ser. No. 393,832, filed June 30, 1982, and assigned to the assignee of this application. Other scroll slitters suitable for use in this application are disclosed in U.S. Pat. No. 3,517,532 and U.S. Pat. No. 3,388,582.

The scroll slitter 14 includes a pair of motor driven arbors 34, 36 upon which there are mounted pairs of mating knives 38, 40. These knives 38, 40 have intermeshing scroll shaped or sinusoidal wave shaped edges 42 which overlap to form a scissors-like cutting action of any material, such as the web of stock material 30 passed between the knives 38, 40. As illustrated in FIG. 1, three strips 24, 26 and 28 of scroll slit material result from passage between the knives 38, 40 of the scroll slitter 14. The scissors cutting action of these knives 38 and 40 forms scroll or sinusoidal shaped edges 44 on the strip 24, 26 and 28.

As illustrated in FIG. 1, the centermost strip 26 has a scroll shaped edge on both sides of the strip while the edgemost strips 24 and 28 have only a single scroll or sinusoidal shaped edge. By mounting additional cutters on the arbors 34 and 36 of the scroll slitter, the outer edges of the outermost strips 24 and 28 may have a similar scroll configuration imparted thereto or a greater number of strips could be formed having either one or both side edges of the strips cut into a scroll configuration.

After emerging from the scroll slitting station 14 the strips pass over a series of supporting rollers 46 into a looping pit 16. This pit extends a substantial distance below the floor level of the slitting line 10. The depth of the looping pit is a function of the length of the coils of web material 30 to be slit on the line. Longer strips of thin stock material require deeper pits than do heavier gauge stock material which are shorter in overall length. In our preferred embodiment of this invention, the pit extends approximately twenty feet below the floor level.

In the practice of this invention the looping pit 16 serves a dual function of (a) facilitating tensioning of all three strips 24, 26 and 28 on the recoiler while differing lengths of strips are wound thereon, and (b) of permitting all three strips to be gapped a distance slightly greater than the amplitude of the scroll or sinusoidal shaped edge imparted to the strips so as to enable all of the strips to be wound onto a common mandrel 50.

Figure 3:
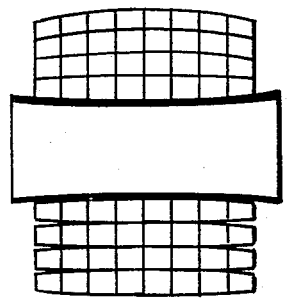
FIG. 3 is a diagrammatic cross sectional view through a coil of sheet metal rolled stock material illustrating the "crown" present on all coils of rolled sheet metal stock.
Figure 4:
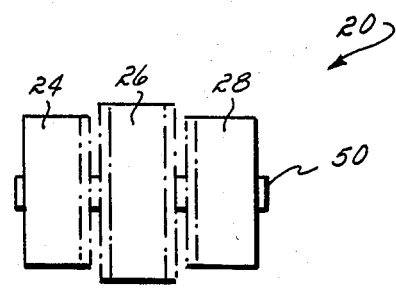
FIG. 4 is an end elevational view taken on line 4—4 of FIG. 1 illustrating the varying diameter of the different strips when tightly wound upon a common mandrel.

A characteristic of all rolled metal webs is that to some degree "crown" is present in every web or strip or rolled sheet metal. The webs are all thicker in the center than at either edge, so that when viewed in cross section, the strip or web 30 is always convex, like a lens, instead of having parallel top and bottom surfaces. This crown is illustrated in FIG. 3. wherein in the top half of the diagram, the crown is accentuated as if all of the cross sections of the web were equally under compression. In actuality, the lower half of the diagram of FIG. 3 better illustrates the manner in which the web 30 is rolled onto a mandrel with the center sections of the strip tightly wound and the outer edges of the strip more loosely wound. As a result of this differential in thickness of the web, when the web is subsequently slit into three strips and all strips are wound under tension on the roll 50, the center strip 26 builds to a larger diameter than the outermost strips 24 and 28. In the absence of some accommodation for this difference in diameter of the different strips, the outer strips 24 and 28 will be loosely wound on the recoiler mandrel 50, while the center strip 26 is tightly wound. Loose strips are very difficult to handle because they tend to slide around and abrade each other or to telescope and create damaged edges on the loosely wound strips. Therefore, some accommodation must be made to insure that all strips are tightly wound on the mandrel.

To combat that crown and the rewind problem created by that crown, the looping pit 16 and tension device 18 are provided between the scroll slitter head 14 and the recoiler 20. The provision of the looping pit upstream of the tensioning unit allows the thinner, looser outer strips to "mark time" until they can be rewound with the tight center wraps. Additionally, the looping pit relieves all of the strips 24, 26 and 28 of any tension between the scroll slitter 14 and the tension unit 18 so that the strips may be fanned apart a distance slightly greater than the amplitude of the sinuous edge of the strips and thereby rewound upon a common mandrel 50. Since the three strips 24, 26 and 28 are rewound at differing rates upon the mandrel 50 of the recoiler 20, the valleys of one strip do not mate with the peaks of the adjacent strip. Therefore, unless the three strips are fanned apart a distance at least as great as the amplitude of the sinuous edge 44 on the strips, the strips will be overlapped when wound upon a common recoiler.

To establish this gap in the strips before the strips pass into the tensioning unit 18, there are stationary spacers 54, 56 located upstream of the tensioning unit at the point at which the strips emerge from the looping pit. In a preferred embodiment these spacers 54, 56 are attached to the same frame (not shown) which supports a series of rollers 58 over which the strip is guided as it emerges from the pit and before it passes into the tensioning unit 18.

The tensioning unit 18 comprises a stationary bottom pad 59 and an upper pad 61 movable downwardly under hydraulic pressure toward the stationary pad 59. In a preferred embodiment of this invention, both these pads have a fabric material, as for example an outdoor rug type fabric applied to the top surface of the lower pad and the bottom surface of the upper pad. These pressure pads flatten the strips and establish alignment of the strips before the strips pass into tensioning rollers 63 and 65 at tension station 18. These tensioning rollers are conventional rubber or friction material covered rollers which have a brake applied thereto so as to tension each of the strips as those strips are pulled onto the mandrel 50 of the motor driven recoiler 20. The braking force applied to the rollers 63 and 65 of the tensioning unit 18 determines the tension applied to the strips as the strips are rewound onto the mandrel 50.

Figure 2:
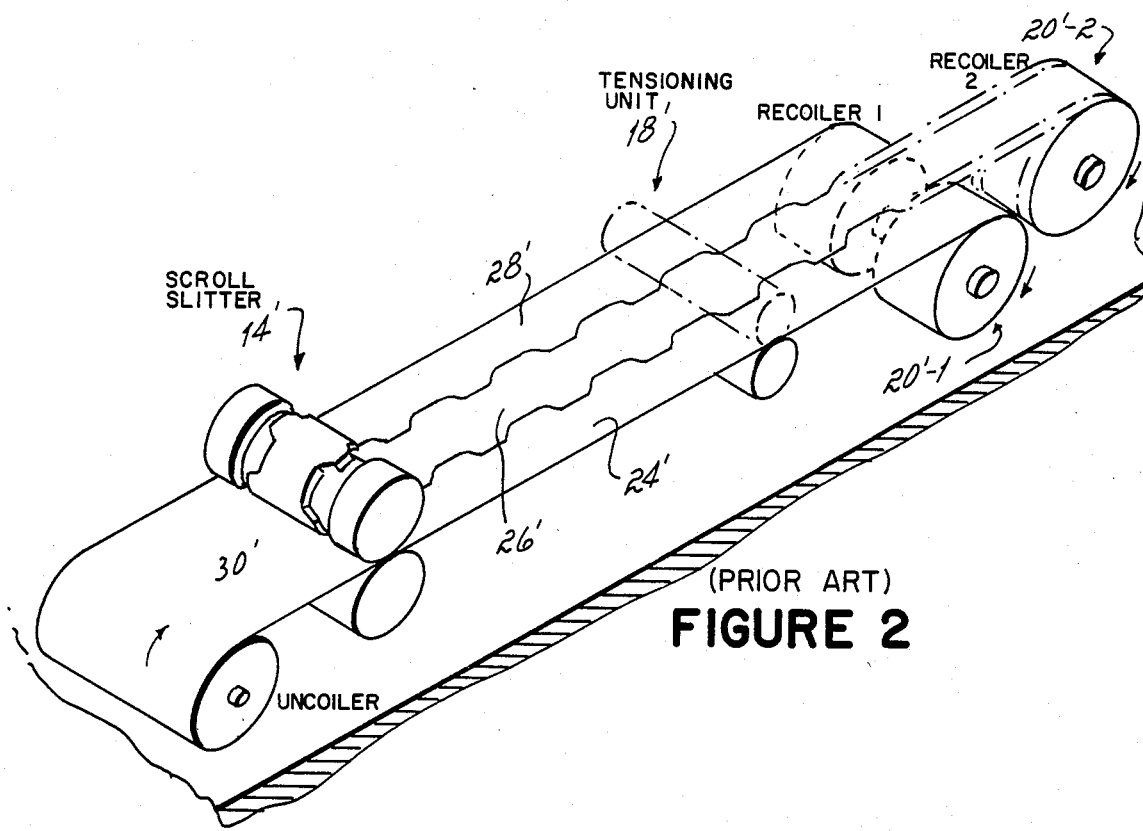
FIG. 2 is a partially diagrammatic perspective view of a prior art scroll slitting line wherein the multiple scroll slit strips are rewound upon multiple mandrels.

With reference now to FIG. 2, there is illustrated a prior art scroll slitting line 10'. Heretofore, it has been the practice to feed the strips of scroll slit material 24', 26' and 28' directly from the scroll slitter 14' through a tensioning unit 18' and onto a pair of recoilers 20'-1 and 20'-2 the first or upstream recoiler 20'-1 of which is operable to wind the two outermost stripss 24', 28' of scroll slit material while the downstream most recoiler 20'-2 winds the center strip 26'. This was the only known method or apparatus for rewinding scroll slit strips prior to the invention of this application. It required though the use of a second recoiler to accommodate the crown of a web of sheet stock material and the spacing required to prevent overlap of scroll slit stripss having a serpentine or wave shaped edge configuration.

In the practice of this invention, a web 30 of rolled stock material is unwound from a coil of sheet metal stock and passed through a scroll slitting station 14. The strips 24, 26 and 28 created by passing through the scroll slitter 14, or at least the outermost strips 24 and 28 are festooned into the looping pit following the slitter and prior to passage of the strips through the tensioning unit 18. By creating this "looseness" of the festooned strips in the looping pit, the strips may be gapped or fanned apart horizontally before the strips are fed into the tensioner 18. This spacing or lateral fanning of the strips is accomplished by the stationary spacers 54, 56 which are adjustable and set to gap each strip sufficiently far apart that the serpentine or wave-shaped edges can be wound onto a single mandrel 50 of a recoiler alongside each other without interference or overlap of the edges of adjacent strips. The spacers 54, 56 are critically spaced at the high point and exit side of the looping pit where no recoiling tension is applied to the strip. Consequently, the strips may be moved laterally or sideways at this point without damage so as to establish the appropriate gap between the strips.

Immediately following passage of the strips past the guides 54, 56, the strips are squeezed between the fabric lined wipe pads 59, 61 under a predetermined hydraulic pressure. This pressure flattens the strips and prevents any further relative lateral movement between the strips as they then are passed between the tensioning rollers 63, 65. The tensioning rollers are connected to a conventional braking system operable to establish a predetermined tension on the strips as the strips are pulled between the tensioning rollers and onto the driven mandrel 50 of the recoiler. Since the strips are tensioned while recoiled, all strips are wound under tension with a very straight wall thereby eliminating the possibility of interleaving of adjacent serpentine shaped edges of the strips. Consequently, the strips are all wound with the same horizontal gap between the strips as was fixed by the guides 54 and 56.

Another known technique for scroll cutting metal webs so as to create a scroll of sinusoidal shaped edge on multiple strips cut from a single web is by passage of the web through a "blanking" line wherein the strips are periodically indexed and then cut by a reciprocating blanking die. To my knowledge, all scroll "blanking" lines operate with a shallow pit following the reciprocating press and preceding a tension device. All scroll blanking lines, of which I am aware, use and require two recoilers because the pit does not extend below the plant floor and consequently the loose strips cannot be gapped far enough apart immediately preceding the tension device to create a gap sufficiently large to accommodate rewind or recoiling of the strips onto a single arbor. Such blanking lines utilize a shallow pit to "isolate" the continuously operating recoiling operation from the intermittent starting and stopping of the strip while the press is reciprocated to cut the blank. Therefore, again to my knowledge, this invention represents the first scroll slitting or scroll blanking line wherein multiple scroll cut strips of metal may be rewound onto a single common arbor.

The obvious advantage of this invention is that it eliminates the need for a second recoiler including a mechanism for driving that recoiler, etc. Additionally, this invention eliminates the need to handle multiple arbors having strips cut from a common web located thereon.

While I have described only a single preferred embodiment of my invention, persons skilled in this art will appreciate changes and modifications which may be made without departing from the spirit of my invention. Therefore, I do not intend to be limited except by the scope of the following appended claims.

I claim:

1. A scroll cutting line for cutting a single web of sheet stock material into multiple scroll cut strips, said line comprising, an uncoiler station including means for supporting an arbor having a web of sheet stock material wound thereon, a scroll cutting station including rotary cutter means for driving the web and for converting said single web of sheet stock material into multiple strips, each of said strips having at least one serpentine shaped scroll cut edge, a recoiling station located downstream from said cutting station, said recoiling station including means for supporting a single rewind arbor and means for driving said rewind arbor in rotation to rewind all of the scroll slit strips of said web of stock material onto said single arbor without any overlap of said strips on said single arbor, a tensioning station located upstream of said recoiling station and including means for applying a tension to said strips as said strips are wound upon said rewind arbor, a looping pit located between said cutting station and said tensioning station, said looping pit being open at the top and extending downwardly a substantial distance below the floor level of said cutting line so as to provide for substantial slack in said strips between said cutting station and said tensioning station, and spacing means located between said strips of scroll slit material upstream of said tensioning means for fanning said strips apart and establishing a gap between said strips before said strips enter said tensioning means, said gap being at least equal to the amplitude of the serpentine shaped edge of said strips so that said strips do not overlap when wound onto said single rewind arbor.

2. A scroll cutting line for cutting a single web of sheet stock material into multiple scroll cut strips, said line comprising, an uncoiler station including means for supporting an arbor having a web of sheet stock material wound thereon, a scroll cutting station including means for converting said single web of sheet stock material into multiple strips, each of said strips having at least one serpentine shaped scroll cut edge, a recoiling station located downstream from said cutting station, said recoiling station including means for supporting a single rewind arbor and means for driving said rewind arbor in rotation to rewind all of the scroll slit strips of said web of stock material onto said single arbor without any overlap of said strips on said single arbon, a tensioning station located upstream of said recoiling station and including means for applying a tension to said strips as said strips are wound upon said rewind arbor, a looping pit located between said cutting station and said tensioning station, said looping pit being open at the top and extending downwardly a substantial distance below the floor level of said cutting line so as to provide for substantial slack in said strips between said cutting station and said tensioning station, and spacing means located between said strips of scroll slit material upstream of said tensioning means for fanning said strips apart and establishing a gap between said strips before said strips enter said tensioning means, said gap being at least equal to the amplitude of the serpentine shaped edge of said strips so that said strips do not overlap when wound onto said single rewind arbor.

* * * * *